United States Patent [19]

Berger et al.

[11] Patent Number: 5,611,416

[45] Date of Patent: Mar. 18, 1997

[54] SPEED LIMITING ACCESSORY DRIVE AND CRANKSHAFT DAMPER

[75] Inventors: Alvin H. Berger, Brownstown; Roy E. Diehl, Northville; Anthony Verduce, Riverview, all of Mich.

[73] Assignee: Ford Motor Company, Dearborn, Mich.

[21] Appl. No.: 578,113

[22] Filed: Dec. 26, 1995

[51] Int. Cl.⁶ .................. F16D 35/00; F16D 43/284; F16F 15/26
[52] U.S. Cl. .............. 192/58.42; 74/574; 192/70.12; 192/82 T; 192/83; 192/104 F; 192/113.36
[58] Field of Search .................. 192/57, 58.42, 192/58.62, 58.67, 82 T, 83, 104 F, 104 R, 103 F, 113.36, 30 V, 70.12; 74/574

[56] References Cited

U.S. PATENT DOCUMENTS

| | | |
|---|---|---|
| 2,981,122 | 4/1961 | Kelley ..................... 192/82 T |
| 3,059,745 | 10/1962 | Tauschek . |
| 3,075,691 | 1/1963 | Kelley ..................... 192/82 T |
| 3,088,566 | 5/1963 | Fleming .................. 192/104 F X |
| 3,170,552 | 2/1965 | Mitchell ................. 192/104 F X |
| 3,262,527 | 3/1966 | Allaben, Jr. . |
| 3,463,284 | 8/1969 | Kampert . |
| 3,556,272 | 1/1971 | Jones . |
| 3,577,802 | 5/1971 | Rumsey . |
| 3,941,225 | 3/1976 | Shiber ................... 192/113.36 X |
| 4,041,803 | 8/1977 | Goloff et al. . |
| 4,145,936 | 3/1979 | Vincent et al. . |
| 4,355,710 | 10/1982 | Schilling . |
| 4,471,861 | 9/1984 | McIntosh . |
| 4,502,345 | 3/1985 | Butterfield . |
| 4,541,513 | 9/1985 | Payne . |
| 4,583,626 | 4/1986 | Spridco . |
| 4,848,183 | 7/1989 | Ferguseon . |
| 4,917,225 | 4/1990 | Diehl et al. . |
| 4,962,688 | 10/1990 | Withers . |
| 5,058,453 | 10/1991 | Graham et al. . |
| 5,148,719 | 9/1992 | Ampferer et al. . |
| 5,231,893 | 8/1993 | Sisco et al. ................. 74/574 |
| 5,234,087 | 8/1993 | Jurgens et al. .............. 192/83 X |
| 5,295,411 | 3/1994 | Speckhart . |
| 5,449,322 | 9/1995 | Wagner ................... 74/574 X |

FOREIGN PATENT DOCUMENTS 1125543  6/1982  Canada .

Primary Examiner—Rodney H. Bonck
Attorney, Agent, or Firm—Donald A. Wilkinson

[57] ABSTRACT

A speed limiting accessory drive and crankshaft damper for use with an engine in a vehicle. A speed limiting drive pulley (16) is affixed to a crankshaft (14) via a hub (42) and includes a pulley member (24) which drives the accessory belt (18). A damper mass (40) is elastically attached to the hub via damper springs (44). A Clutch assembly (36) is operatively located between the damper mass and pulley member, with a piston (54) or bellows biased against and engaging the clutch assembly. Oil located throughout the clutch assembly is acted on by centrifugal force when the drive pulley is rotating and acts to push against the biases of the piston. This allows the clutch to slip at high engine speeds, thus limiting the speed of the pulley member. A heat compensating mechanism acts to counter the pushing force of the oil if the temperature of the oil rises too high due to the clutch slippage, thereby reducing clutch slip.

20 Claims, 4 Drawing Sheets

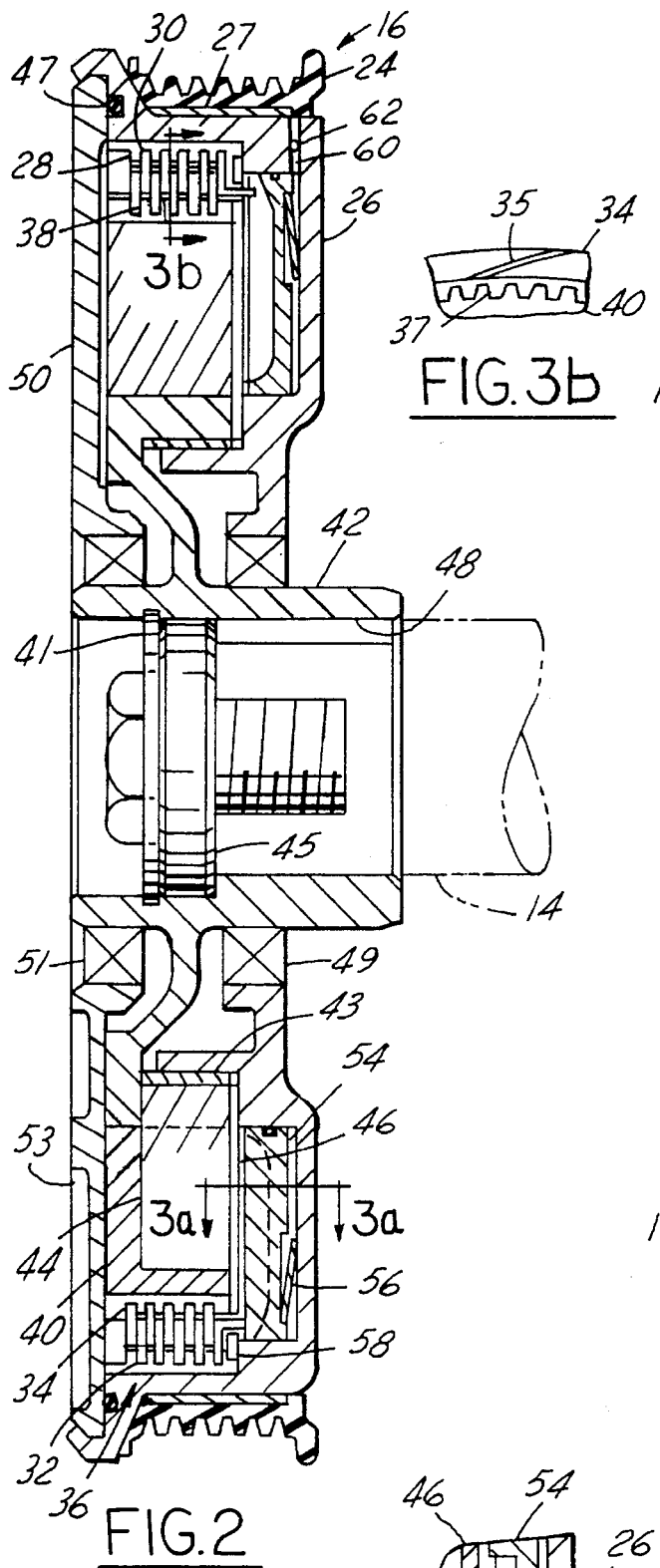
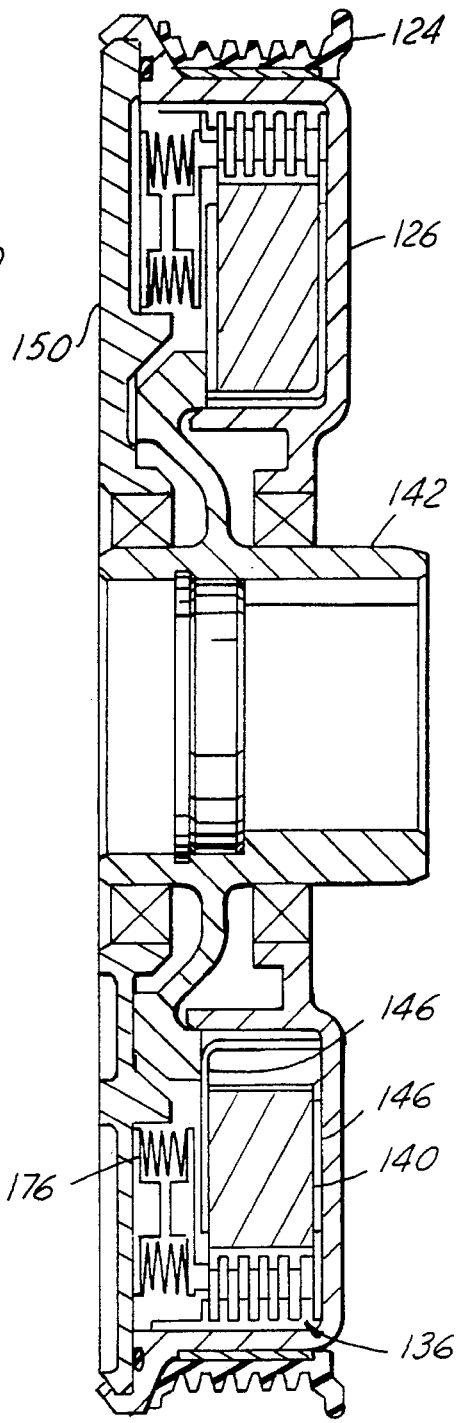
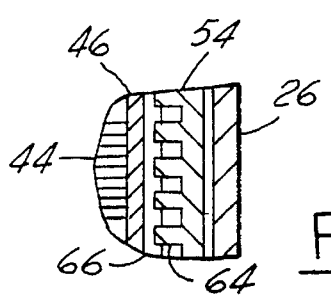

SPEED LIMITING ACCESSORY DRIVE AND CRANKSHAFT DAMPER

FIELD OF THE INVENTION

The present invention relates to engines in vehicles that employ accessory drives, which limit the driven speed of the accessories at high engine speeds, combined with crankshaft dampers.

This application is related to a co-pending patent application Ser. No. 08/578,112, titled SPEED LIMITING ACCESSORY DRIVE, filed herewith, and incorporated herein by reference.

BACKGROUND OF THE INVENTION

Conventional engines in vehicles not only provide power for the drive train but also provide power for accessories. Such accessories may include an air o conditioning compressor, a water pump, a power steering pump, an alternator, etc. Generally, these accessories are driven by the engine via driven pulleys coupled to a driving pulley by a belt, with the driving pulley driven by the engine crankshaft. Thus, the accessories are driven at some predetermined ratio of the engine crankshaft speed, with the driving speed changing when the engine speed changes.

In today's vehicles, drivers expect that the accessories will work for all engine operating 1) conditions. Thus, at engine idle, when the engine is generally running its slowest, and therefore the accessories are driven at their slowest speeds, the ratio of accessory driven speed to crankshaft speed must be sufficient to completely power these accessories (i.e., have adequate capacity). However, with this capacity designed-in for low engine speed conditions, when the engine is running at very high speeds (RPMs) the driving speed may be too high and overpower some accessories, creating the possibility for excessive wear of the accessories and additional noise and vibrations. Currently, for a given set of accessories, this situation requires a trade-off, then, between the minimum idle speed allowed for an engine and the maximum speed at which the engine can operate depending upon the ratio of the pulleys.

With a fixed pulley system and accessory size, possible solutions to this predicament are to either limit the minimum RPMs for engine idle conditions, thereby allowing for adequate capacity for the accessories, or to limit the upper speed (RPM) range, limiting the potential for overpowering; neither one a very satisfactory solution. The first hurts fuel economy at idle and the second would limit the engine power.

Accordingly, it is desirable to provide an accessory pulley system that will allow the accessories to be sized to handle the accessory load (adequate capacity) at low idle speeds, to increase fuel economy, while not over-driving the accessories at high engine speeds and minimizing the cost and complications needed in the pulley system to accomplish this. Furthermore, it is desirable that this system will operate automatically, without the need for external inputs, in order to minimize the complexity of the overall system.

One drawback to a speed limiting accessory pulley system is that it will generally take up more room on the crankshaft than a conventional pulley system. This extra room needed may interfere with a crankshaft damper on engines so equipped. A conventional crankshaft damper consists of an iron ring resiliently mounted on the nose of a crankshaft by a rubber donut. The purpose of the crankshaft damper is to damp out the crankshaft vibrations when the resonant frequency of the crankshaft corresponds to the engine firing frequency. Therefore, it is desirable to provide both functions within a minimum amount of space.

SUMMARY OF THE INVENTION

In its embodiments, the present invention contemplates a speed limiting accessory drive and crankshaft damper, adapted to be rotationally driven by a crankshaft of an engine and drive engine accessories, which limits the maximum speed at which the accessories are driven and is adapted to dampen predetermined vibrations in the crankshaft. The speed limiting accessory drive and crankshaft damper includes a hub member adapted to be rotationally fixed to the crankshaft, a housing mounted about and rotatable relative to the hub with the housing including a cavity, and a pulley member mounted on and rotationally fixed relative to the housing. The accessory drive and damper also includes a damper mass mounted within the cavity, and a plurality of damper springs elastically coupling the damper mass to the hub. A wet clutch assembly, is mounted radially outward within the housing cavity and includes a plurality of friction discs and a plurality of separator plates interleaved with the friction discs, with the friction discs being rotationally fixed relative to the damper mass and the separator plates being rotationally fixed relative to the housing. A front cover mounted to the housing for sealing the cavity in the housing, and biasing means are located in the cavity and rotationally fixed relative to the housing, for exerting a first force on the clutch assembly to press the separator plates into contact with the friction discs. Fluid fills the cavity in the housing, whereby the pulley member will be driven at crankshaft speed for low crankshaft rotational speeds, and the fluid will exert a second force on the biasing means opposite the first force to allow clutch slip at a maximum pulley rotational speed for high crankshaft rotational speeds.

Accordingly, an object of the present invention is to provide a speed limiting accessory drive and crankshaft damper for use in a pulley system of an engine, which limits the maximum speed at which the pulley system drives the accessories, enabling increased drive ratios for the pulley system at low engine speeds over conventional pulley systems, while providing vibrational damping for the crankshaft.

An advantage of the present invention is that the engine can be made to idle at lower speeds, while still providing adequate accessory capacity at these speeds, by employing increased drive ratios for the pulley system, while still not over-driving the accessories at high engine speeds, thereby increasing the fuel economy of the vehicle.

A further advantage of the present invention is that both the speed limiting components and the crankshaft damping components are contained in a minimal amount of space within the engine compartment.

An additional advantage of the present invention is that the accessories are automatically driven slower at higher engine speeds, thereby increasing operating life of and reducing noise and vibrations produced by the accessories at these speeds.

A still further advantage of the present invention is that the accessories will not need to change speed on wide open throttle shifts, which eliminates belt squeal problems associated with shifts from first to second gear under wide open throttle conditions.

BRIEF DESCRIPTION OF THE DRAWINGS

FIG. 2 is a side, sectional view of the speed limiting drive pulley assembly;

FIG. 3a is a sectional view taken along line 3a—3a in FIG. 2 and FIG. 3b is a sectional view taken along line 3b—3b in FIG. 2;

FIG. 7 is a view similar to FIG. 2 illustrating a second embodiment of the present invention.

DETAILED DESCRIPTION OF THE PREFERRED EMBODIMENTS

Figure 1:
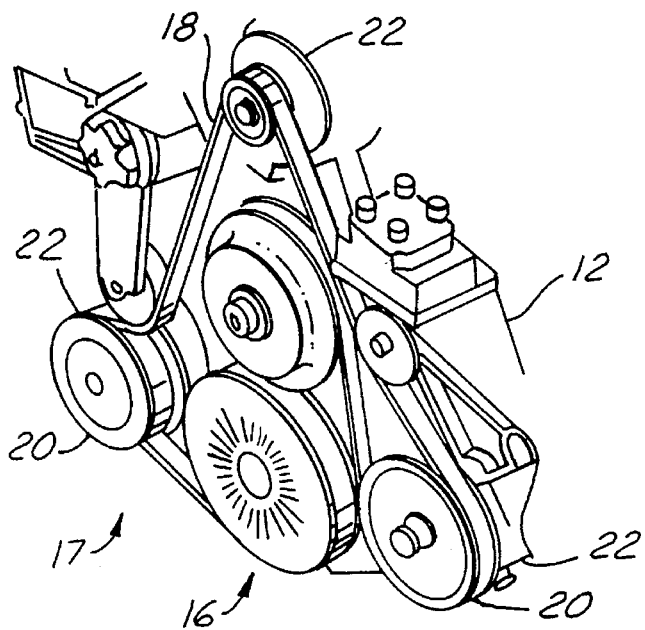
FIG. 1 is a partial perspective view of the front of an engine with a pulley system in accordance with the present invention.

An engine 12 includes a crankshaft 14 having a speed limiting drive pulley assembly 16 attached to it, forming part of a pulley system 17. The drive pulley assembly 16 frictionally engages an accessory belt 18 mounted about it, which engages driven pulleys 20 on conventional engine accessories 22.

The speed limiting drive pulley assembly 16 includes a pulley member 24 which is affixed about a ring shaped pulley housing via a tolerance ring 27. The tolerance ring 27 serves to retain the pulley member 24 to the housing 26 and yet insulates the pulley member 24 from the temperature of the housing 26.

An outer ring portion of the housing 26 includes internal splines 28 splined to teeth 30 on a series of separator plates 32. This rotationally fixes the separator plates 32 relative to the housing 26. The separator plates 32 are interleaved with a series of friction discs 34 to form a wet clutch assembly 36. The friction discs 34 have friction paper on each side and radially spiraling grooves 35 on both of their paper faces.

The friction discs 34 also have teeth 37 which are engaged to splines 38 on a ring shaped damper mass (damper ring) 40. This rotationally fixes the friction discs 34 relative to the damper mass 40. The damper mass 40 is elastically attached to a hub 42 through damper spring packs 44, made up of six steel leaf springs. Alternate spring packs 44 are pre-stressed in opposite directions (clockwise and counterclockwise) so that even at maximum damper excitation the springs never become completely unloaded, eliminating the possibility for unsprung free-play between the damper mass 40 and the hub 42. The damper assembly is tuned to the resonant frequency of the crankshaft, similar to a conventional crankshaft damper.

A bushing 43 separates the damper springs 44 from the housing 26. A damper plate 46 is rigidly attached to the hub 42 and is located adjacent to the face of the damper mass 40 to provide viscous friction to the damper mass 40.

The hub 42 of the speed limiting drive pulley assembly 16 includes a bore 48 which is splined to the conventional engine crankshaft 14 and held in place with a screw and washer/puller 45. When the removal of the hub 42 from the crankshaft 14 is desired, a retaining ring 41 serves to transfer the pulling force from the washer/puller 45 to the hub 42. A rear oil seal 49 seals between the housing 26 and the hub 42, while allowing the two to rotate relative to each other.

The clutch assembly 36 basically allows torque to be transmitted from the hub 42 to the pulley member 24. The torque transmitting capability of the clutch assembly 36 is proportional to the axial load it receives that presses its members together.

A front cover 50 includes a series of radial grooves 52 on its inside surface. It also includes radially extending fins 53 on the outside surface. The front cover 50 mounts to the housing 26, and a front oil seal 51 seals between the cover 50 and the hub 42 while allowing the two to rotate relative to each other. An O-ring 47 seals between the cover 50 and housing 26.

A piston 54 is located adjacent to the clutch assembly 36 in a mating bore in the housing 26, with a belleville spring (disc spring) 56 mounted between the piston 54 and the housing 26 to bias the piston 54 toward the clutch assembly 36. The belleville spring 56 provides a spring force that is relatively constant over the range of the piston travel, which reduces sensitivity to assembly tolerances and clutch wear. As an option, the spring force of the belleville spring 56 can be selected to produce an increased force when the clutch pack wears and a glazing of the friction discs 34 causes a reduction of the coefficient of friction.

During assembly, the piston 54 is initially installed into the mating bore in the housing 26 with the enclosed volume between the piston 54 and the bottom of the bore entirely filled with a volatile liquid such as a solution of water and ethylene glycol. A retaining ring 58 is installed to keep the piston 54 inside the bore and the piston 54 is forced to the bottom of the bore to force most of the liquid out through an evacuation passage 60 in the housing 26. The back face of the piston 54 is configured so that when the piston 54 is forced to the bottom of the bore and the belleville spring 56 is pressed flat, the enclosed volume is very small. The evacuation passage 60 is then permanently sealed with a plug 62 to retain the small remaining amount of the liquid inside the bore and to prevent the entry of any air. When the piston 54 is released, the belleville spring 56 pushes the piston 54 outward against the retaining ring 58. The enclosed volume now contains only a small amount of the liquid and the vapor from the liquid.

The front face of the piston 54 has radially oriented fins 64 to give good heat transfer from oil, discussed below, in front of the piston 54 to the liquid behind the piston 54. The fins 64 also force the oil to rotate with the piston 54 so that the hydraulic force acting on the piston 54 is a function of the housing rotational speed, and not of the hub speed. The first separator plate in the series includes a member 66 that engages with the radial fins 64 of the piston 54 to prevent the piston 54 from rotating relative to the housing 26.

During assembly, the internal spaces of the pulley housing 26 are filled with oil and sealed therein when the front cover 50 is attached, so oil surrounds the entire clutch assembly 36.

During engine operation, the speed limiting drive pulley assembly 16 is basically direct drive at low engine speeds, i.e., the pulley member 24 rotates at crankshaft speed with no slip between the two. The belleville spring 56 biases the piston 54 against the wet clutch assembly 36 with enough force to allow torque to be transmitted through the pulley assembly 16 from the hub 42 to the pulley member 24 with no slip.

As the housing 26 is rotated faster by the crankshaft 14, the centrifugal force on the oil will cause it to push outward. As it pushes outward, it also presses against the piston 54 in the opposite direction of the belleville spring force. This reduces the amount of force with which the piston 54 pushes against the clutch assembly 36. Thus, as the housing 26 speeds up more, the force of the piston continues to be reduced, and the torque transmitting capability of the clutch assembly 36 lessons. The friction discs 34 can then begin to slip relative to the separator plates 32.

The torque transmitted during slipping operation conditions is through shearing of the fluid (oil) between the separator plates 32 and friction discs 34, which minimizes wear of the friction elements. By selecting the appropriate size and shape of piston 54 and spring force for the belleville spring 56, the oil pressure can completely cancel the force of the belleville spring 56 and allow the slipping at the desired rotational speed.

Figure 6:
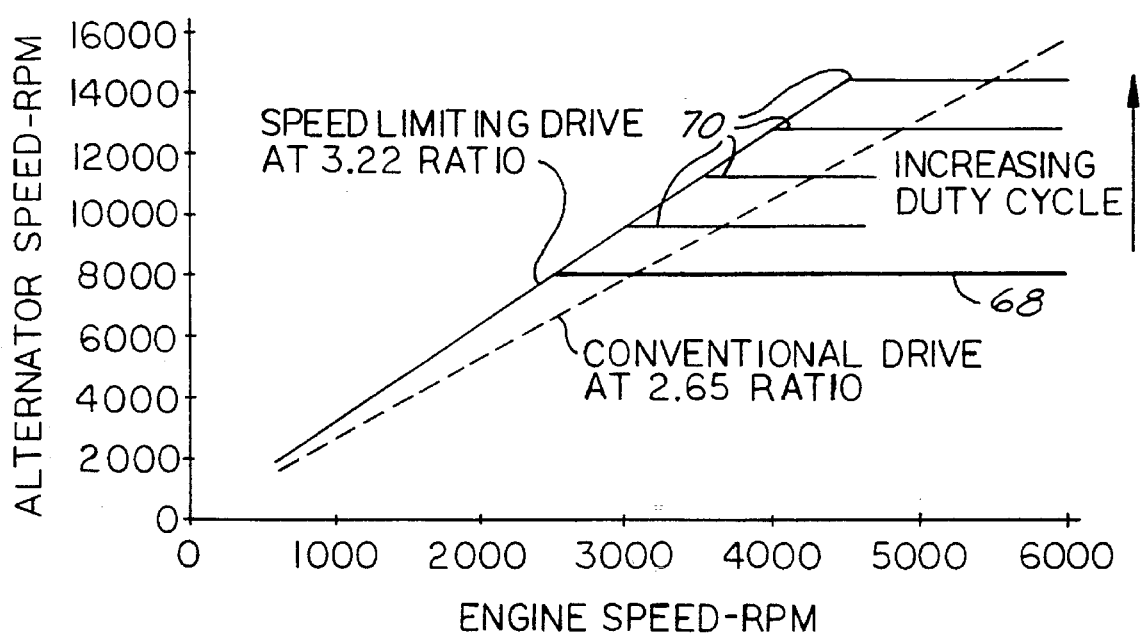
FIG. 6 is a graph illustrating an example of the driven speed of an accessory versus the engine speed with and without the speed limiting drive pulley assembly.
Figure 4:
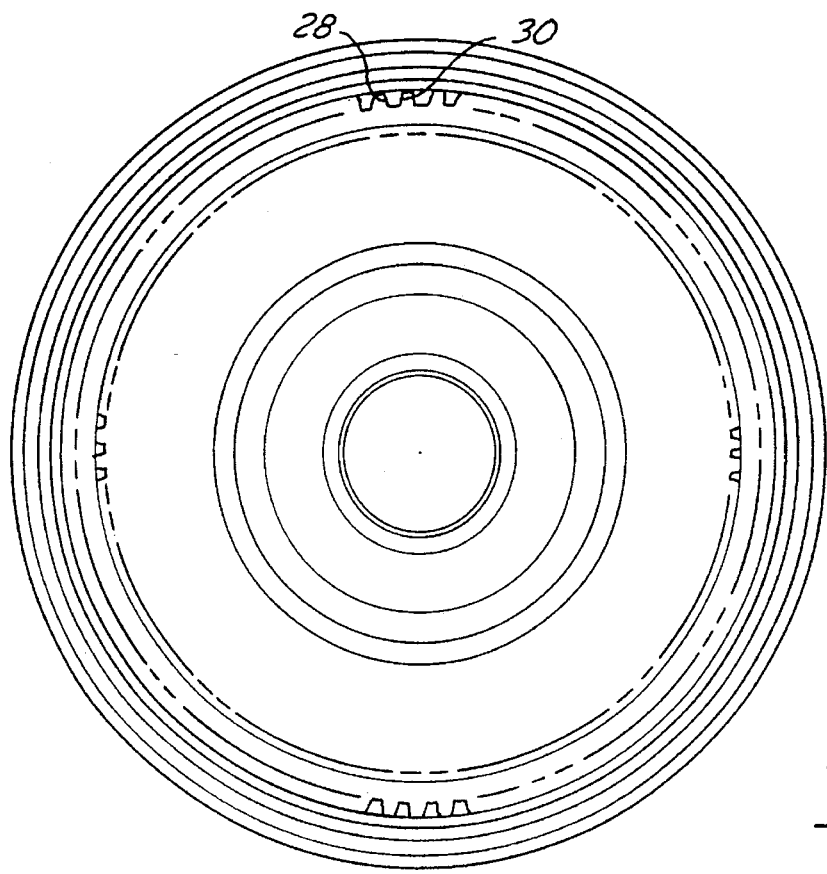
FIG. 4 is a partial front view of the pulley system with the front cover removed.
Figure 5:
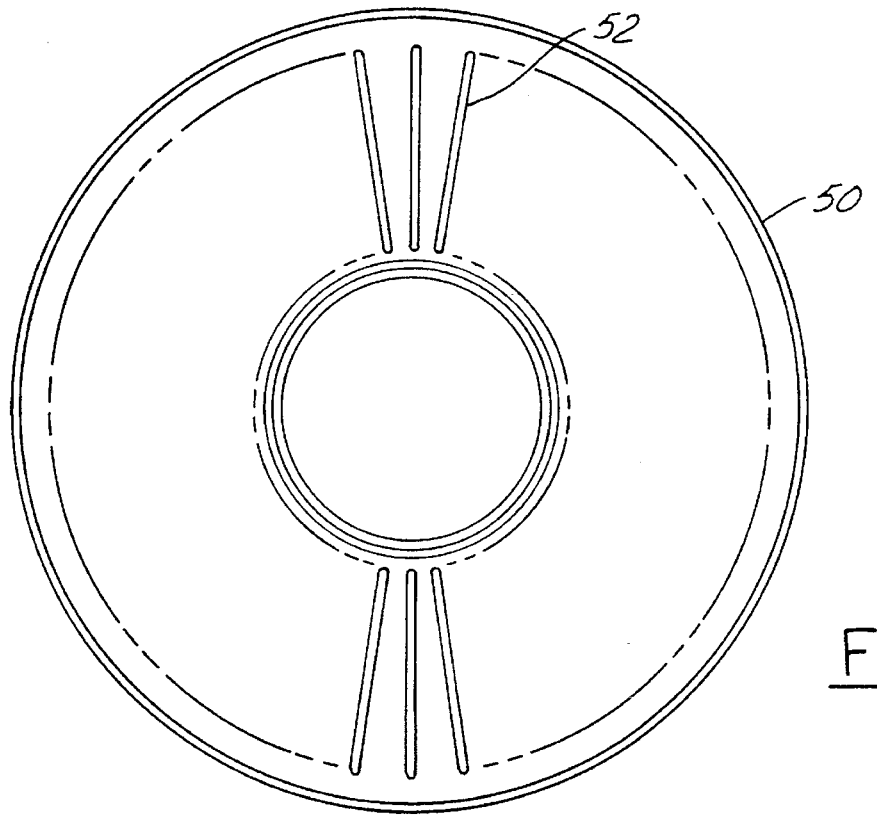
FIG. 5 is a view of the inside of the front cover of the pulley system.

With increasing speed, the torque transmitting capability of the clutch assembly 36 diminishes such that with minimal accessory load, the pulley member speed is limited to a particular maximum speed while the hub 42 (and crankshaft 14) may rotate considerably faster. Line 68 in FIG. 6 illustrates the speed limit.

During clutch slipping, heat is produced in the fluid being sheared at the clutch faces. The difference in rotational speed between the grooves 35 in the friction discs 34, which rotate faster than the housing 26 and fling oil outward; and grooves 52 in the front cover 50, which rotates slower than the crankshaft 14 and allows the oil to travel radially inward, creates a pressure differential that pumps the fluid in a loop out from the clutch assembly 36, in past the front cover 50 and back to the clutch assembly 36. Further, the fins 53 on the outside of the front cover 50 reject heat from the oil in the grooves 52 to the air around the engine.

It is expected that in most applications and for most typical engine operations, the engine 12 will spend very little time at high enough speeds to cause slipping in the clutch assembly 36 and the small amount of slipping that occurs will not produce a large amount of heat. In some applications, however, the engine 12 may operate at high speeds for extended periods of time. The resulting prolonged slipping in the clutch assembly 36 will release a significant amount of heat, which will raise the temperature of the speed limiting drive pulley assembly 16.

There is a high temperature compensating feature to limit the maximum temperature at which the clutch operates. With increasing temperature of the oil, and hence the piston 54, the water vapor pressure behind piston 54 (in the housing bore with the belleville spring) acts on the piston 54 against the pushing action of the oil. This puts additional clamping load on the clutch assembly 36, increasing the housing speed at which the clutch will begin slipping. Since water vapor pressure versus temperature is highly non-linear, very little change in pressure occurs between cold and normal operating temperature and thus does not substantially affect the force applied to the clutch assembly 36 by piston 54, yet a large increase in force occurs between normal to hot temperatures, due to an increase of the pressure behind the piston 54 and adding to the clamping load on the clutch assembly 36. This serves to account for engine operating conditions where the clutch assembly 36 is heating up too much due to operation at high crankshaft speed for an extended period of time. While the accessories are now driven at a faster upper speed limit, possibly increasing noise and wear, the possible damage to the speed limiting drive assembly due to over() heating is minimized.

The graph in FIG. 6 illustrates higher maximum speed cutoffs 70 above the base cut off speed 68 for an alternator based upon the effect of the heat compensating mechanism.

A separate function that the speed limiting drive pulley assembly 16 performs is as a crankshaft torsional damper. The damper mass 40, being elastically connected to the crankshaft 14 through the damper springs 44 acts in a manner similar to a conventional rubber mass mounting an iron ring to a crankshaft. However, the damper springs 44 are made of steel rather than rubber to resist the strain caused by the higher amplitude of motion of the smaller inertia mass that is required to allow it to be packaged inside of the housing 26. With the damper assembly tuned to the resonant frequency of the crankshaft, it cancels the vibrations of the crankshaft as its resonance gets out of phase with the crankshaft. With this arrangement, both the speed limiting and damper functions are performed using less space than with two separate assemblies.

Figure 8:
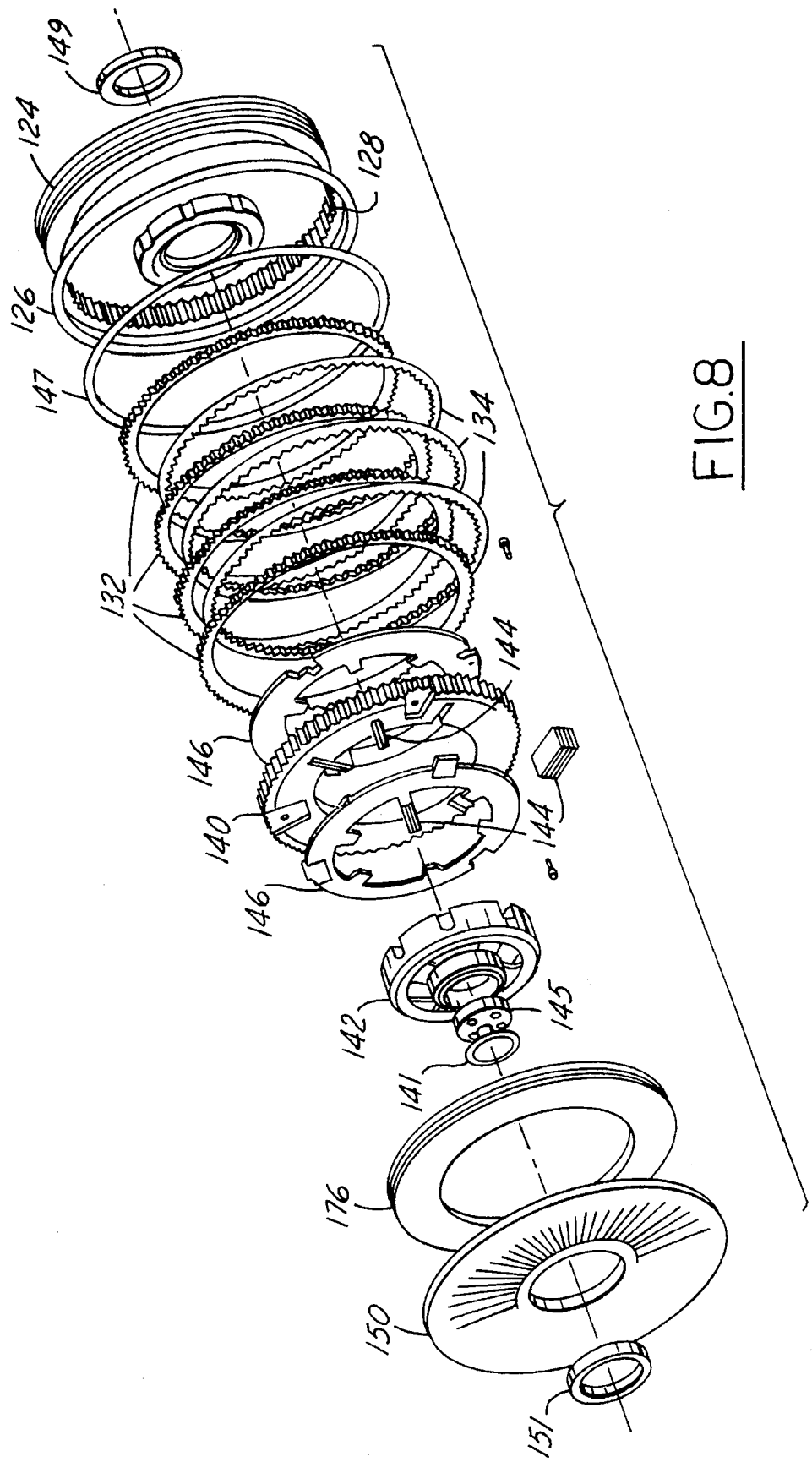
FIG. 8 is an exploded perspective view of the speed limiting drive pulley assembly of the alternate embodiment of FIG. 7.

A second embodiment is disclosed in FIGS. 7 and 8 where the piston and belleville spring of the first embodiment are replace with a sealed bellows arrangement. For purposes of this description, elements in this embodiment that have counterpart elements in the first embodiment have been identified by similar reference numerals, although given 100 series numbers.

The hub 142 still drives the pulley member 124 through a clutch assembly 136. In this case, however, the axial force applied to the clutch assembly 136 is provided by a sealed bellows 176. The bellows 176 is located between the front cover 150 and clutch assembly 136. The free length of the bellows 176 is longer than its installed length, so that in assembly, the elastic compression of the bellows' convolutions produces a spring force on the clutch assembly 136, enabling the clutch assembly 136 to transmit torque. Optionally, if needed, an additional spring, not shown, may augment the force. In this embodiment, damper plates 146 are located on both sides of the damper mass 140.

Oil in the housing 126 surrounds the bellows 176. Similar to the first embodiment, when the housing 126 rotates at high speed, centrifugal acceleration on the oil produces a pressure that acts to compress the bellows 176, reducing the clamping load on the clutch assembly 136 and allowing the clutch to slip.

Further, the interior of the bellows 176 is evacuated except for a small amount of fluid (such as water). This acts as a high temperature compensating feature as in the first embodiment. When the clutch 136 is slipping, heat is produced in the fluid being sheared at the clutch faces, as discussed above. As the oil passes from the clutch assembly 136 to the front cover 150 and back again, it flows around the bellows 176 and heats it to the oil temperature. If the temperature rises, the bellows 176, being evacuated of air, but containing the small amount of liquid, will try to expand due to an increase in vapor pressure. The bellows 176 will then press harder against the clutch assembly 136, reducing the slipping, and thus reducing the heat input to the system. At low and moderate temperatures, the torque transmitting capability is not significantly affected by changes of temperature, but as the temperature of the clutch 136 approaches damaging levels, the torque carrying capacity increases sufficiently to decrease the amount of slipping and resulting friction heat to minimize additional temperature increase.

The damping function of the damper mass 140 and springs 144 operates in the same fashion as the first embodiment.

While certain embodiments of the present invention have been described in detail, those familiar with the art to which this invention relates will recognize various alternative designs and embodiments for practicing the invention as defined by the following claims.

We claim:

1. A speed limiting accessory drive and crankshaft damper, adapted to be rotationally driven by a crankshaft of an engine and drive engine accessories, which limits the maximum speed at which the accessories are driven and is adapted to dampen predetermined vibrations in the crankshaft, the speed limiting accessory drive and crankshaft damper comprising:

a hub member adapted to be rotationally fixed to the crankshaft;

a housing mounted about and rotatable relative to the hub, the housing including a cavity;

a pulley member mounted on and rotationally fixed relative to the housing;

a damper mass mounted within the cavity, and a plurality of damper springs elastically coupling the damper mass to the hub;

a wet clutch assembly, mounted radially outward within the housing cavity, including a plurality of friction discs and a plurality of separator plates interleaved with the friction discs, with the friction discs being rotationally fixed relative to the damper mass and the separator plates being rotationally fixed relative to the housing;

a front cover mounted to the housing for sealing the cavity in the housing;

biasing means, located in the cavity and rotationally fixed relative to the housing, for exerting a first force on the clutch assembly to press the separator plates into contact with the friction discs; and fluid, filling the cavity in the housing, whereby the pulley member will be driven at crankshaft speed for low crankshaft rotational speeds, and the fluid will exert a second force on the biasing means opposite the first force to allow clutch slip at a maximum pulley rotational speed for high crankshaft rotational speeds.

2. The accessory drive and damper of claim 1 further including temperature compensating means for creating a third force on the biasing means in the direction of the first force as the temperature of the biasing means rises.

3. The accessory drive and damper of claim 2 wherein the biasing means is a bellows, elastically compressed and located in the cavity adjacent to the clutch assembly.

4. The accessory drive and damper of claim 3 wherein the temperature compensating means comprises liquid sealed within the bellows which vaporizes upon heating.

5. The accessory drive and damper of claim 3 further including fluid flow means for cooling the fluid when the clutch assembly slips.

6. The accessory drive and damper of claim 1 further including fluid flow means for cooling the fluid when the clutch assembly slips.

7. The accessory drive and damper of claim 6 wherein the fluid flow means comprises radially spiraling grooves in the friction discs and radial grooves in the front cover adjacent to the cavity.

8. The accessory drive and damper of claim 1 wherein the biasing means is a piston, located in the cavity adjacent to the clutch assembly, and spring means, located between the piston and the housing, for creating the first force of the piston which biases the piston against the clutch assembly.

9. The accessory drive and damper of claim 8 wherein the temperature compensating means comprises liquid trapped between the piston the housing which vaporizes upon heating.

10. The accessory drive and damper of claim 8 further including fluid flow means for cooling the fluid when the clutch assembly slips.

11. The accessory drive and damper of claim 10 wherein the fluid flow means comprises radially spiraling grooves in the friction discs and radial grooves in the front cover adjacent to the cavity.

12. The accessory drive and damper of claim 1 wherein each of the damper springs is made up of packs of steel leaf springs.

13. A speed limiting accessory drive and crankshaft damper, adapted to be rotationally driven by a crankshaft of an engine and drive engine accessories, which limits the maximum speed at which the accessories are driven and is adapted to dampen predetermined vibrations in the crankshaft, the speed limiting accessory drive and crankshaft damper comprising:

a hub member adapted to be rotationally fixed to the crankshaft;

a housing mounted about and rotatable relative to the hub, the housing including a cavity;

a pulley member mounted on and rotationally fixed relative to the housing;

a damper mass mounted within the cavity, and a plurality of damper springs elastically coupling the damper mass to the hub;

a wet clutch assembly, mounted radially outward within the housing cavity, including a plurality of friction discs and a plurality of separator plates interleaved with the friction discs, with the friction discs being rotationally fixed relative to the damper mass and the separator plates being rotationally fixed relative to the housing;

a front cover mounted to the housing for sealing the cavity in the housing;

a bellows, elastically compressed and located in the cavity adjacent to the clutch assembly, and rotationally fixed relative to the housing, for exerting a first force on the clutch assembly to press the separator plates into contact with the friction discs; and fluid, filling the cavity in the housing, whereby the pulley member will be driven at crankshaft speed for low crankshaft rotational speeds, and the fluid will exert a second force on the bellows opposite the first force to allow clutch slip at a maximum pulley rotational speed for high crankshaft rotational speeds.

14. The accessory drive and damper of claim 13 further including temperature compensating means for creating a third force on the bellows in the direction of the first force as the temperature of the bellows rises.

15. The speed limiting accessory drive of claim 14 wherein the temperature compensating means comprises liquid sealed within the bellows which vaporizes upon heating and wherein the accessory drive further includes a fluid flow means for cooling the fluid when the clutch assembly slips.

16. The accessory drive and damper of claim 13 wherein each of the damper springs is made up of packs of steel leaf springs.

17. In combination, a speed limiting accessory drive and crankshaft damper, adapted to be rotationally driven by a crankshaft of an engine and drive engine accessories, which limits the maximum speed at which the accessories are driven and is adapted to dampen predetermined vibrations in the crankshaft, the combination comprising:

a hub member adapted to be rotationally fixed to the crankshaft;

a housing mounted about and rotatable relative to the hub, the housing including a cavity;

a pulley member mounted on and rotationally fixed relative to the housing;

a damper mass mounted within the cavity, and a plurality of damper springs elastically coupling the damper mass to the hub;

a wet clutch assembly, mounted radially outward within the housing cavity, including a plurality of friction discs and a plurality of separator plates interleaved with the friction discs, with the friction discs being rotationally fixed relative to the damper mass and the separator plates being rotationally fixed relative to the housing;

a front cover mounted to the housing for sealing the cavity in the housing;

a piston, located in the cavity adjacent to the clutch assembly and rotationally fixed relative to the housing, and a compressed spring located between the piston and housing, for exerting a first force on the clutch assembly to press the separator plates into contact with the friction discs; and fluid, filling the cavity in the housing, whereby the pulley member will be driven at crankshaft speed for low crankshaft rotational speeds, and the fluid will exert a second force on the piston opposite the first force to allow clutch slip at a maximum pulley rotational speed for high crankshaft rotational speeds.

18. The combination of claim 17 further comprising temperature compensating means for creating a third force on the piston in the direction of the first force as the temperature of the piston rises.

19. The combination of claim 18 wherein the temperature compensating means comprises liquid trapped between the piston and housing which vaporizes upon heating and wherein the accessory drive further comprises fluid flow means for cooling the fluid when the clutch assembly slips.

20. The speed limiting accessory drive of claim 17 wherein the compressed spring is a belleville spring, and each of the damper springs is made up of packs of steel leaf springs.

* * * * *